United States Patent
Vidergar

(10) Patent No.: US 7,854,789 B1
(45) Date of Patent: Dec. 21, 2010

(54) SYSTEM AND PROCESS FOR CONTROLLING POLLUTANT EMISSIONS IN A CEMENT PRODUCTION FACILITY

(75) Inventor: Ronald John Vidergar, Olathe, KS (US)

(73) Assignee: Ash Grove Cement Company, Overland Park, KS (US)

(*) Notice: Subject to any disclaimer, the term of this patent is extended or adjusted under 35 U.S.C. 154(b) by 170 days.

(21) Appl. No.: 12/059,167

(22) Filed: Mar. 31, 2008

(51) Int. Cl.
*B01D 53/06* (2006.01)
*B01D 46/02* (2006.01)

(52) U.S. Cl. .............. 95/107; 95/134; 96/150; 110/216; 110/345

(58) Field of Classification Search ............ 96/123, 96/134, 150; 95/107, 108, 134; 55/341.1; 110/203, 216, 345
See application file for complete search history.

(56) References Cited

U.S. PATENT DOCUMENTS

| | | |
|---|---|---|
| 2,875,844 A | 3/1959 | Pring |
| 3,922,210 A | 11/1975 | Isfort et al. |
| 4,260,399 A | 4/1981 | Kawasaki |
| 4,271,134 A | 6/1981 | Teller |
| 4,273,747 A | 6/1981 | Rasmussen |
| 4,319,890 A | 3/1982 | Teller et al. |
| 4,354,942 A | 10/1982 | Kaczur et al. |
| 4,388,067 A | 6/1983 | Christiansen |
| 4,432,776 A | 2/1984 | Hölter et al. |
| 4,728,342 A | 3/1988 | Åbom |
| 4,844,815 A | 7/1989 | Ader et al. |
| 4,889,698 A | 12/1989 | Moller et al. |
| 4,917,862 A | 4/1990 | Kraw et al. |
| 4,919,905 A | 4/1990 | Horaguchi et al. |
| 4,956,162 A | 9/1990 | Smith et al. |

(Continued)

FOREIGN PATENT DOCUMENTS

DE 197 45 191 A1 4/1999

(Continued)

OTHER PUBLICATIONS

Vagn C. Johansen and Garth J. Hawkins; Mercury Emission and Speciation from Portland Cement Kilns; Portland Cement Association Research & Development Information; Serial No. 2567a; 2003.

(Continued)

*Primary Examiner*—Frank M Lawrence
(74) *Attorney, Agent, or Firm*—Stinson Morrison Hecker LLP

(57) ABSTRACT

A system and method for controlling pollutant emissions in a cement manufacturing facility. The system comprises first and second particulate control devices in series and a sorbent supply provided downstream of the first particulate control device. Exhaust process gas from the pyroprocessing unit of the cement manufacturing facility is conveyed through the first particulate control device in order to remove at least a portion of the kiln dust within the exhaust process gas to form a de-dusted exhaust process gas. The kiln dust removed from the exhaust process gas may then be recycled back to the pyroprocessing unit for use in the kiln feed. The sorbent supply injects a sorbent for capturing pollutants into the de-dusted exhaust process gas upstream of the second particulate control device to form a treated gas. The spent sorbent containing the captured pollutants is removed from the treated gas within the second particulate control device to form a cleansed exhaust process gas.

25 Claims, 3 Drawing Sheets

U.S. PATENT DOCUMENTS

| | | | |
|---|---|---|---|
| 5,024,681 | A | 6/1991 | Chang |
| 5,044,286 | A | 9/1991 | Breen et al. |
| 5,158,580 | A | 10/1992 | Chang |
| 5,169,611 | A | 12/1992 | Kupper et al. |
| 5,190,908 | A | 3/1993 | Audeh et al. |
| 5,264,013 | A * | 11/1993 | Brentrup .................. 95/128 |
| 5,362,319 | A | 11/1994 | Johnson |
| 5,387,406 | A | 2/1995 | Ruoff |
| 5,505,766 | A | 4/1996 | Chang |
| 5,556,447 | A | 9/1996 | Srinivasachar et al. |
| 5,732,365 | A | 3/1998 | Howard et al. |
| 5,769,938 | A | 6/1998 | Ueshima et al. |
| 5,803,894 | A | 9/1998 | Kao et al. |
| 5,827,352 | A | 10/1998 | Altman et al. |
| 5,855,666 | A | 1/1999 | Kao et al. |
| 6,083,431 | A | 7/2000 | Ikari et al. |
| 6,146,133 | A | 11/2000 | Erhard et al. |
| 6,490,984 | B1 | 12/2002 | Moriya et al. |
| 6,491,751 | B1 | 12/2002 | Watson |
| 6,547,712 | B1 | 4/2003 | Ikari et al. |
| 6,695,911 | B2 | 2/2004 | Ramesohl et al. |
| 6,709,510 | B1 | 3/2004 | Young et al. |
| 6,790,034 | B1 | 9/2004 | Kearns et al. |
| 6,805,554 | B2 | 10/2004 | Ludger et al. |
| 7,040,891 | B1 | 5/2006 | Giuliani |
| 7,048,784 | B2 * | 5/2006 | Terasaki et al. ............ 95/271 |
| 7,279,039 | B2 | 10/2007 | Schwab et al. |
| 2003/0206843 | A1 | 11/2003 | Nelson, Jr. |

FOREIGN PATENT DOCUMENTS

| | | |
|---|---|---|
| DE | 10 2007 005 788 A1 | 8/2008 |
| JP | 2006 096615 A | 4/2006 |

OTHER PUBLICATIONS

John Richards; Capabilities and Limitations of Available Control Techniques for Mercury Emissions from Cement Kilns; Portland Cement Association Research & Development Information; Serial No. 2748a; 2005.

Robert J. Schreiber, Jr., Charles D. Kellett, and Nalin Joshi; Inherent Mercury Controls Within the Portland Cement Kiln System; Portland Cement Association Research & Development Information; Serial No. 2841; 2005.

Vagn C. Johansen and Garth J. Hawkins; Mercury Speciation in Cement Kilns: A Literature Review; Portland Cement Association Research & Development Information; Serial No. 2567; 2003.

Environmental Protection Agency; National Emission Standards for Hazardous Air Pollutants from the Portland Cement Manufacturing Industry; Final Rule and Proposed Rule; Federal Register; Dec. 20, 2006.

Constance Senior, Adel Sarofim, and Eric Eddings; Behavior and Measurement of Mercury in Cement Kilns; for Presentation at the IEEE-IAS/PCA 45$^{th}$ Cement Industry Technical Conference; May 2003; Dallas, Texas.

Gerald L. Young; Review of Activated Carbon Injection for Control of Mercury; Portland Cement Association; SP128; 2002.

Frank Behan; Preliminary Results of Mercury Removal Efficiency With Activated Carbon Injection During Emissions Testing at a Lafarge Corporation Cement Kiln; Memorandum to RCRA Docket F-96-RCSP-FFFFF; Apr. 2, 1996.

* cited by examiner

SYSTEM AND PROCESS FOR CONTROLLING POLLUTANT EMISSIONS IN A CEMENT PRODUCTION FACILITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed to the field of pollution control, and is more specifically directed to a system and process for controlling mercury and other pollutant emissions in a cement manufacturing facility.

2. Description of Related Art

The cement manufacturing process begins with quarrying the raw materials. The primary raw material component is limestone which serves as the calcium source for the cement. Smaller quantities of sand (source of silica), shale or clay (source of aluminum), and iron ore or slags (source of iron) are also utilized in the process. The quarried material is reduced in size by a crusher and the crushed material is then transported to the cement manufacturing facility. The proper proportions of the raw materials are then mixed and further reduced by grinding the materials in a raw mill to form the raw mix. This raw mix is heated within a pyroprocessing kiln at relatively high temperatures in excess of 2750° F. to form "clinker." The clinker is further processed and mixed with gypsum to form cement. The pyroprocessing kiln is fired with large quantities of fuel. A variety of different fuel sources may be utilized, including coal, coke, natural gas, heating oil, tires, and/or waste derived fuels.

The heated exhaust process gas from the kiln contains a significant amount of particulate material known as kiln dust as well as various gaseous pollutants such as organic compounds, carbon dioxide, oxides of sulfur, hydrogen chloride, oxides of nitrogen, and trace metals such as mercury. A majority of the particulate material may be removed from the exhaust process gas and recycled back into the raw mix using various processing techniques known in the industry. Of note, the heated exhaust process gas leaving the kiln may be passed through a pre-heater tower within the pyroprocessing unit and/or may be passed through the raw mill. While the primary purpose for running the gas though these units is to utilize the heated gas to heat and dry the raw mix, a secondary benefit is that a substantial amount of the kiln dust within the gas is captured back into the raw mix for subsequent processing. In addition, it is known to pass the exhaust process gas through a particulate control device such as a baghouse to filter and remove additional kiln dust from the gas before emitting the gas from the facility via a stack. This collected kiln dust may then be mixed with the raw mix and recycled back to the pyroprocessing kiln.

Additional methods have been developed for further reducing the amount of particulates and other pollutants from the emissions of cement manufacturing facilities. For example, U.S. Pat. No. 7,040,891 to Giuliani discloses a system for reducing fuel consumption and pollutant emissions from asphalt production facilities by supplying at least one sorbent to the exhaust process gas stream coming from the kiln and then conveying the treated exhaust process gas to a baghouse in order to precipitate at least a portion of the spent sorbent. A portion of the treated gaseous waste stream from the baghouse is then directed to the inlet burner of the kiln as fuel in order to reduce fuel consumption of the kiln. Any residue or organic compounds and/or carbon monoxide are burned within the kiln helping to reduce the concentration of these compounds in the stack. While this method may be useful for pollution control, it does not enable recycling and reuse of the kiln dust as raw mix for clinker production, since the filtered waste stream is "contaminated" with spent sorbent. U.S. Pat. No. 7,279,039 to Schwab et. al. also discloses a method and apparatus for reducing air pollutants associated with cement manufacturing, wherein the raw mix is heated in a special heating chamber to drive off volatile compounds such as organic materials and salts of ammonia, before introduction into the kiln. While this method may be useful for capturing and controlling the volatile compounds contained within the exhaust process gas, a need remains in the art to further enhance pollutant control and, in particular, to further reduce the emission of vapor phase trace metals such as mercury.

Both the raw materials and the fuel used in the cement manufacturing process may contain minute concentrations of mercury (Hg), which can become part of the stack emissions when heated in the kiln system to the high temperatures necessary to produce quality clinker. Mercury is found in the environment in several forms including elemental (Hg), oxidized (HgO), organic (e.g. $CH_3Hg$, MeHg) and particulate-bound. Limited data are available relating to mercury emissions associated with cement kiln operations, but it is believed that all forms of mercury are found within the emissions except organic mercury which is likely thermodynamically precluded from forming due to the high temperatures involved in the process. Significant variability over short periods of time in both total mass mercury may be found in the exhaust process gas due to the variability in concentrates and type of mercury found in the various raw materials and fuel.

A variety of techniques have been used for removing mercury from gas streams in other industries such as from the flue gas of coal fired power plants. These techniques include injecting sorbents into the gas stream before a particulate collection device, passing the gas stream through a packed bed of sorbent or using a wet system to capture mercury compounds. However, these various techniques have not heretofore been employed for removing mercury from the exhaust process gas of a cement manufacturing facility, wherein the chemical content of the exhaust process gas and the components of the facility are very different from a power plant.

BRIEF SUMMARY OF THE INVENTION

The present invention is directed to a system and method for controlling pollutant emissions in a cement manufacturing facility and is particularly useful for reducing the amount of trace metals such as mercury in the emissions of a cement manufacturing facility. The system comprises first and second particulate control devices in series and a sorbent supply provided downstream of the first particulate control device. Exhaust process gas from the pyroprocessing unit of the cement manufacturing facility is conveyed through the first particulate control device in order to remove at least a portion of the kiln dust within the exhaust process gas to form a de-dusted exhaust process gas. The kiln dust removed from the exhaust process gas may then be recycled back to the kiln feed storage equipment for re-use in the kiln feed. The sorbent supply injects a sorbent for capturing pollutants into the de-dusted exhaust process gas upstream of the second particulate control device to form a treated gas. The spent sorbent containing the captured pollutants is removed from the treated gas within the second particulate control device to form a cleansed exhaust process gas for emission or subsequent additional use.

It is believed that this system will be particularly effective and consistent in removing a majority of the mercury or other targeted pollutants from the exhaust process gas, even though the concentration and specific form of the mercury or other targeted pollutants may vary considerably during operation of the facility. Injecting the sorbent downstream of the first particulate control device enables the kiln dust to be recycled as kiln feed to the kiln thereby increasing the efficiency of the system. Furthermore, by removing a significant amount of the kiln dust from the exhaust process gas in the first particulate control device, a reduced amount of sorbent is needed to capture the mercury or other targeted pollutants. This system and method may be used with any type of cement manufacturing facility including those having a pyroprocessing unit comprising a dry process kiln with a pre-heater tower, a dry process kiln with a pre-heater tower and calciner, a long dry process kiln or a long wet process kiln.

In one embodiment, a cement manufacturing facility having a system for controlling mercury emissions comprises a pyroprocessing unit having a pyroprocessing kiln, a first baghouse adapted to remove at least a portion of the particulates contained within the exhaust process gas from the pyroprocessing unit to form a de-dusted exhaust process gas, a sorbent supply adapted to inject sorbent transversely across the de-dusted exhaust process gas stream to form a treated exhaust process gas, and a second baghouse adapted to remove spent sorbent containing mercury from the treated exhaust process gas to form a cleansed exhaust process gas. A large percentage of the particulate is removed from the exhaust process gas within the first baghouse, thereby leaving only small concentrations of pollutants, such as mercury, within the de-dusted exhaust process gas. In this manner, the sorbent injected into the de-dusted exhaust process gas flow can be more effectively utilized to interact with the pollutant so that it may be collected as spent sorbent in the second baghouse.

In a preferred embodiment, the system and method of the present invention is utilized in a cement manufacturing facility having a pyroprocessing unit comprising a dry kiln with a pre-heater and calciner and having a conduit for transporting the exhaust process gas through the raw mill upstream of the pollution control system. In this embodiment, hot exhaust process gas from the dry kiln is transported via a conduit to the pre-heater in order to pre-heat the kiln feed. The exhaust process gas exiting the pre-heater is then optionally transported via conduit to a raw mill in order to assist in drying the raw materials. The exhaust process gas is then transported via conduit to a first particulate control device to remove at least a portion of the kiln dust contained within the exhaust process gas and form a de-dusted exhaust process gas. The first particulate control device is preferably a baghouse having a plurality of filter bags. The kiln dust removed by the first particulate control device may be routed back to the pyroprocessing unit for use in the kiln feed. The de-dusted exhaust process gas from the first particulate control device is transported via conduit to a second particulate control device. A sorbent is supplied to the de-dusted exhaust process gas upstream of the second particulate control device to form a treated exhaust process gas. For systems targeting mercury, the sorbent preferably comprises activated carbon. Mercury or other targeted pollutants within the treated exhaust process gas are captured or sorbed by the sorbent. The spent sorbent including the mercury and other targeted pollutants is then removed from the treated exhaust process gas by the second particulate control device to form a cleansed exhaust process gas. The second particulate control device is preferably a baghouse having a plurality of bag filters. The spent sorbent is collected and discharged from the second particulate control device for disposal. The cleansed exhaust process gas may then be emitted to the environment via a stack or may otherwise be utilized.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
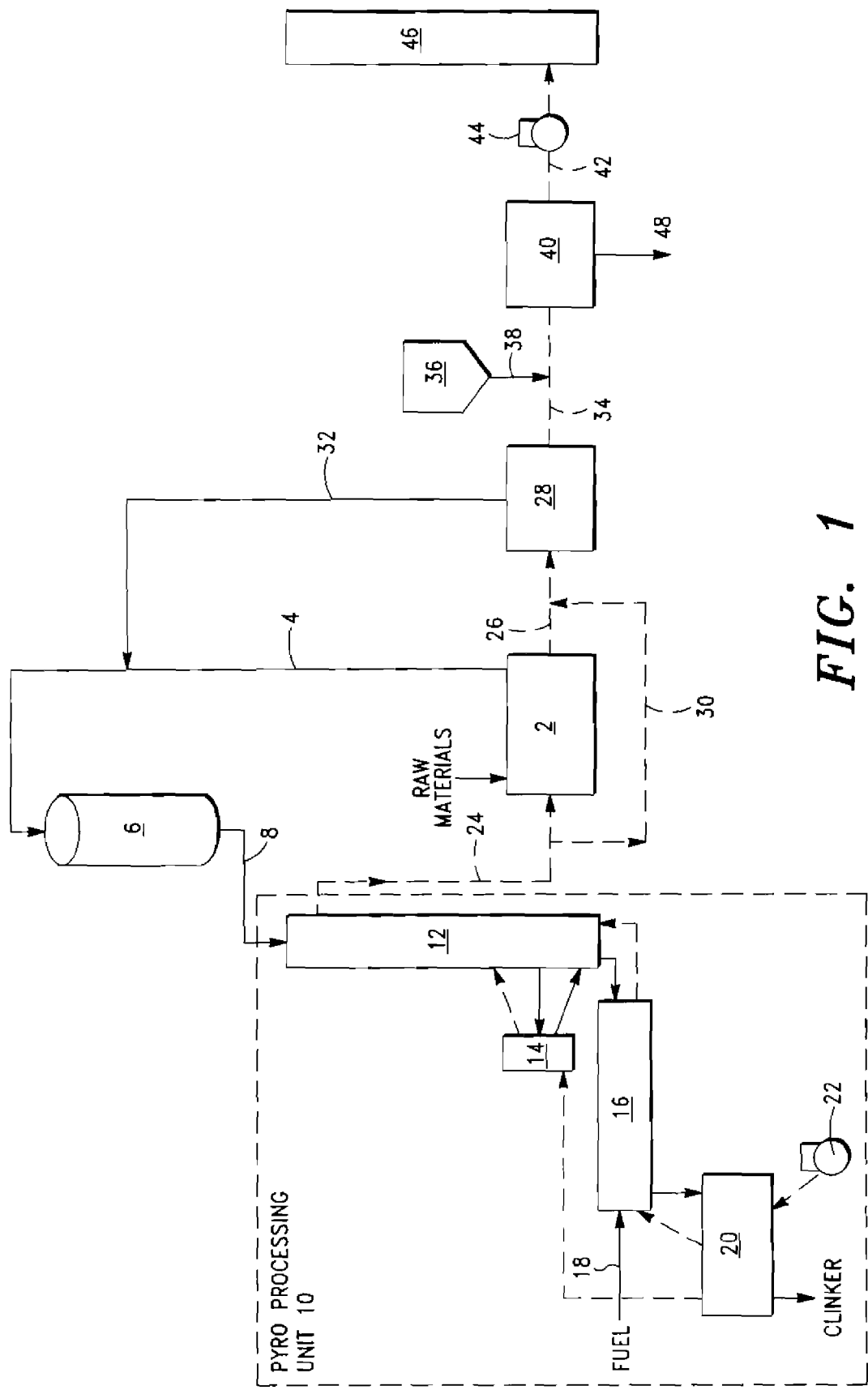
FIG. 1 is a schematic of a cement manufacturing facility having a system for controlling pollutant emissions in accordance with an embodiment of the present invention, wherein the cement manufacturing facility utilizes a pyroprocessing unit having a dry kiln with a pre-heater tower and a calciner vessel.
Figure 2:
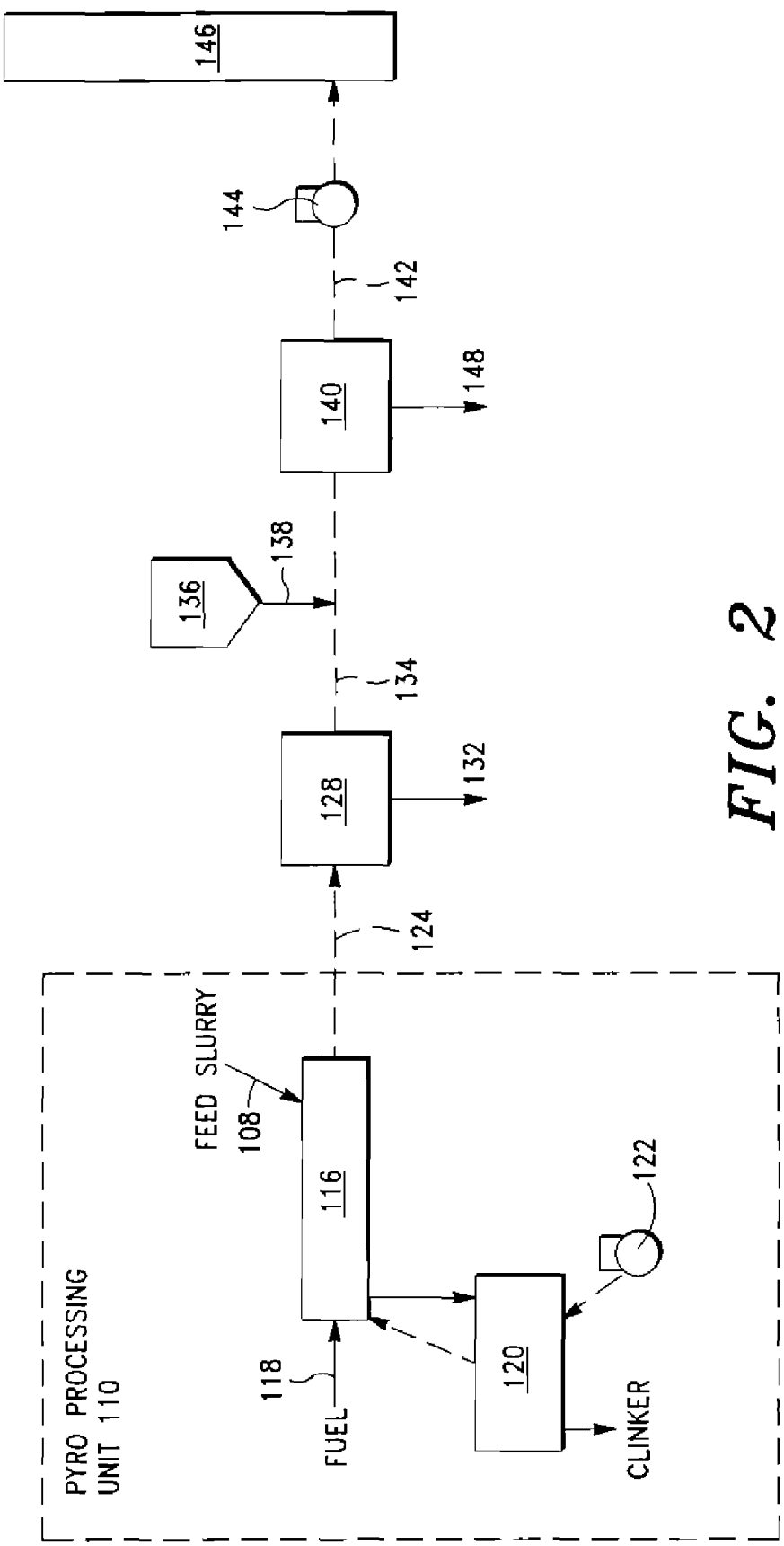
FIG. 2 is a schematic of a cement manufacturing facility having a system for controlling pollutant emissions in accordance with an embodiment of the present invention, wherein the cement manufacturing facility utilizes a pyroprocessing unit having a wet kiln.
Figure 3:
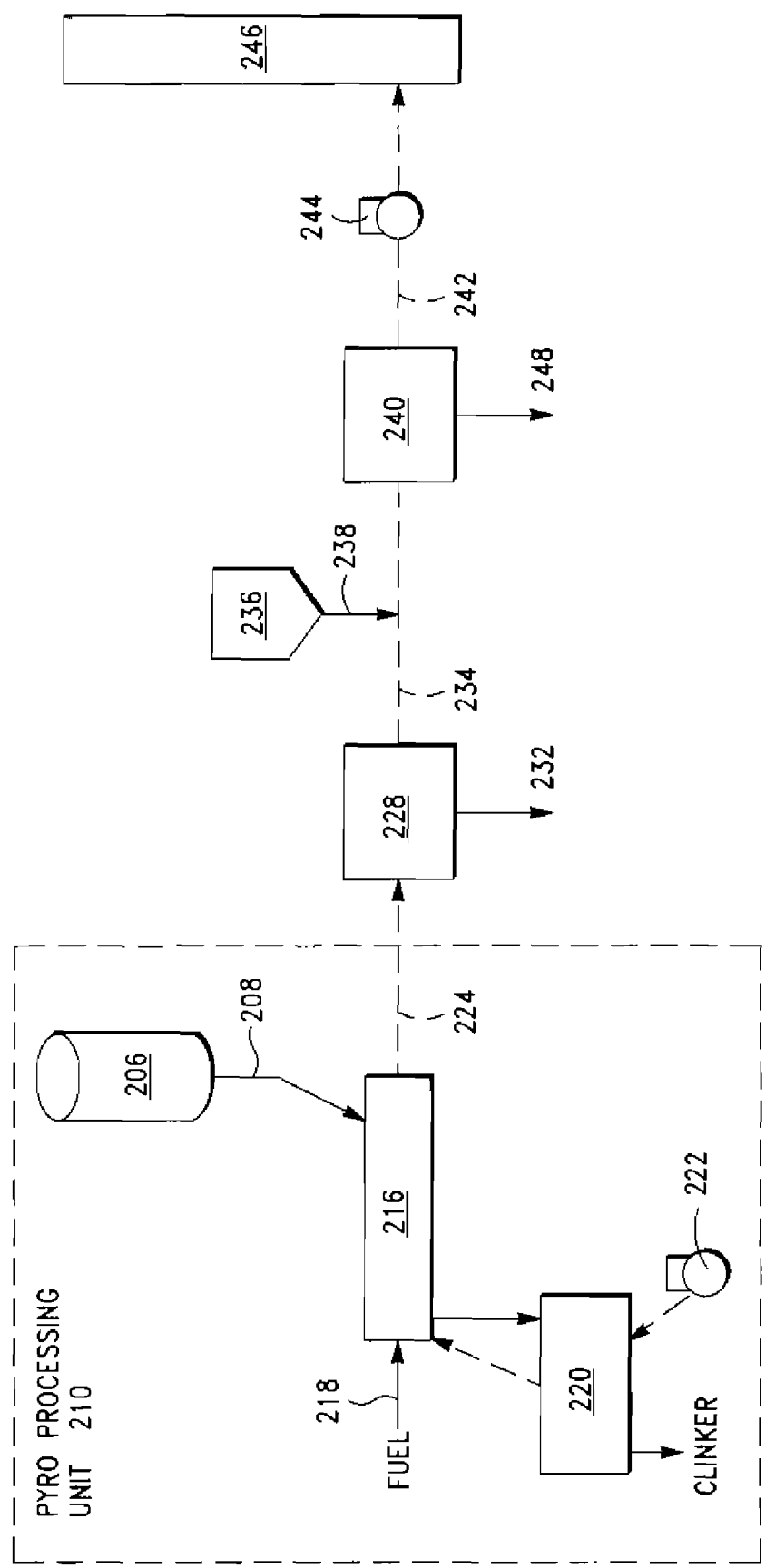
FIG. 3 is a schematic of a cement manufacturing facility having a system for controlling pollutant emissions in accordance with an embodiment of the present invention, wherein the cement manufacturing facility utilizes a pyroprocessing unit having a long dry kiln.

Various types of cement manufacturing facilities, each having a system for controlling mercury emissions in accordance with a preferred embodiment of the present invention, is shown in schematic form in FIGS. 1, 2 and 3. The movement of solid material, namely, the raw mix and clinker, is shown by solid lines and the flow of gases is shown with dashed lines.

Dry Kiln with Pre-Heater and Calciner

With reference to FIG. 1, raw materials comprising limestone, shale, clay and iron ore are withdrawn from storage silos (not shown) in proportioned amounts and conveyed to raw mill 2. Raw mill 2 grinds and dries the raw materials to form a raw mix. In the preferred embodiment shown in FIG. 1, the raw mill is an "in-line" raw mill meaning that it utilizes exhaust process gases from the pyroprocessing unit 10 to dry and separate the raw mix. The raw mix is conveyed via conduit 4 for storage in a blending and homogenizing silo 6. The raw mix is combined with kiln baghouse dust in silo 6 to form kiln feed that is fed by means of feeder conveyer 8 to the pyroprocessing unit 10. The kiln feed is pre-heated in a preheater tower 12 which comprises of a series of vertically stacked, cyclone chambers (not shown) using hot exhaust process gas from the dry kiln 16 and calciner 14 to heat the kiln feed. The heated kiln feed is introduced into calciner 14 which converts the calcium carbonate ($CaCO_3$) in the limestone into calcium oxide (CaO), releasing carbon dioxide ($CO_2$) in the process. After calcination, the kiln feed is conveyed to the bottom of pre-heater tower 12 and introduced into a large rotary dry kiln 16 where it is heated to temperatures exceeding 2750° F. The calcium oxide or lime (CaO) reacts with alumina, silica, and iron in the kiln 16 to make clinker as is known in the art.

Various fuels may be used to support combustion within the kiln in order to achieve the high processing temperature that is required. The facility may be adapted to use any number of different fuel sources including coal, coke, natural gas, heating oil, used oil, tires or waste derived fuels to provide the energy required for the kiln and calciner. Fuel is delivered via line 18 to a multichannel burner pipe (not shown) in kiln 16 and may also be delivered at various locations along the length of the kiln or in other areas of the pyroprocessing unit such as directly to calciner 14. The hot clinker is discharged from the kiln into a cooler 20 and cool air is forced into the cooler via forced air fan 22. The cooler air becomes heated as it cools the clinker. This heated air is directed from cooler 20 into kiln 16 and calciner 14 to assist with combustion. After being cooled, the clinker is discharged from cooler 20 for further processing to form cement.

The hot exhaust process gases from kiln 16 and the calciner 14 flow to pre-heater tower 12. After passing through pre-heater tower 12, the exhaust process gases are routed via conduit 24 through raw mill 2 in order to assist in drying the raw materials. It is noteworthy that some kiln dust in the exhaust process gas is captured within the raw mix in the raw mill and conveyed via conduit 4 up to the storage silo 6 for subsequent pyroprocessing within the kiln feed. The exhaust process gas then flows along conduit 26 to a first baghouse 28 to remove kiln dust from the exhaust process gas to form a de-dusted exhaust process gas. First baghouse 28 preferably utilizes a plurality of fabric filter bags and most preferably is designed so that a section can be selectively taken off-line for cleaning the fabric filter bags within any given section. The kiln dust removed from the exhaust process gas is collected on the filter fabric filter bags and recycled back as kiln baghouse dust into silo 6 via conveyer 32 for blending with the raw mix. The kiln baghouse dust can be removed from the bags using any means known in the art include using a reverse-air system or compressor system to pulse air through the bags. The loosened particulate material from the bags falls into collection hoppers (not shown) and conveyors remove the material for recycling. It should be understood that while a first baghouse is suggested for use in removing the kiln dust from the exhaust process gas, other types of particulate control devices may be utilized as is now known or later developed in the art for removing particles from a gas such as an electrostatic precipitator. It is anticipated that this first baghouse or other particulate control device may already be in-use in an existing cement manufacturing facility that is retrofitted to include a pollutant control system in accordance with the present invention.

The de-dusted exhaust process gas is transported from first baghouse 28 via exhaust conduit 34 to a second baghouse 40. A sorbent supply 36 containing a sorbent adapted to sorb or capture targeted pollutants such as mercury is positioned upstream second baghouse 40. Sorbent supply 36 is adapted to inject the sorbent into the de-dusted exhaust process gas stream via conduit 38 to form a treated exhaust process gas. Sorbent supply 36 and conduit 38 are preferably configured to inject the sorbent in a direction transverse exhaust conduit 34 so as to enhance mixing of the sorbent with the targeted pollutants in the de-dusted exhaust process gas flowing through exhaust conduit 34.

Raw mill 2 may be shut-down from time to time for maintenance purposes. During those times, the pyroprocessing unit 10 continues to operate utilizing the raw mix stored in silo 6 and the exhaust process gas is routed via an alternate conduit 30 directly to the first baghouse 28. The amount of targeted pollutants in the exhaust process gas may be higher at times when the raw mill is shut down. Thus, the injection rate of sorbent may be increased during those times in order to more effectively remove the pollutants.

Second baghouse 40 downstream of sorbent supply 36 receives the treated stream and the spent sorbent including the captured targeted pollutants is removed from the treated exhaust process gas to form a cleansed exhaust process gas. The spent sorbent is collected on the filter fabric bags within second baghouse 40 and discharged as a waste stream 48. Second baghouse 40 preferably comprises a plurality of fabric filter bags and is preferably designed so that a section can be selectively taken off-line to clean the filter bags and dispose of the spent sorbent within any given section. Valves (not shown) may be provided to govern the flow of the treated exhaust process gas into the sections. The spent sorbent may be removed from the filter bags in any manner known in the art. For example, the fabric filter bags may be cleaned by using a reverse-air system to dislodge the collected spent sorbent from the filter media of the bags or using a compressor for pulsing the filter bags with pulsed air. The spent sorbent loosened from the filter bags falls to the bottom of the baghouse compartment and exits through a drain duct into collection hoppers (not shown) or other means for collecting, further processing, and transporting the spent sorbent for disposal.

The cleansed exhaust process gas is transported via exhaust conduit 42 to stack 46 for release into the atmosphere. Fan 44 draws the exhaust process gas through the first and second baghouses 28, 40 and propels the exhaust process gas stream to stack 46 for release into the atmosphere. Fan 44 is preferably a variable speed fan which can be adjusted to accommodate differing flow rates and pressure differentials within the system.

Wet Kiln

Looking now to FIG. 2, the system for controlling pollutant emissions is shown applied within a cement manufacturing facility having a pyroprocessing unit 110 using a wet kiln 116. In this embodiment, the raw materials comprising limestone, shale, clay and iron ore are provided in proportioned amounts in the form of a wet feed slurry as is known in the art. The wet slurry is introduced via conduit 108 into a large wet kiln 116 where it is heated to temperatures exceeding 2750° F. The calcium oxide or lime (CaO) reacts with alumina, silica, and iron in the kiln 116 to make clinker as is known in the art.

Various fuels may be used to support combustion within the kiln in order to achieve the high processing temperature that is required. The facility may be adapted to use any number of different fuel sources including coal, coke, natural gas, heating oil, used oil, tires, or waste derived fuels. Fuel is delivered via line 118 to a multichannel burner pipe (not shown) in kiln 116 and may also be delivered at various locations along the length of the kiln. The hot clinker is discharged from the kiln into a cooler 120 and cool air is forced into the cooler via forced air fan 122. The cooler air becomes heated as it cools the clinker. This heated air is directed from cooler 120 into kiln 116 to assist with combustion. After being cooled, the clinker is discharged from cooler 120 for further processing to form cement.

The hot exhaust process gases from kiln 116 are routed via exhaust conduit 124 to a first baghouse 128 to remove cement kiln dust particulate materials from the exhaust process gas to form a de-dusted exhaust process gas. The kiln dust particulate materials removed from the exhaust process gas are discharged as a kiln baghouse dust waste stream 132 and may be recycled for use in the feed slurry. First baghouse 128 preferably utilizes a plurality of fabric filter bags and is preferably designed to have a plurality of sections that can be selectively taken off line for cleaning the fabric filter bags within any given section. Of course, it should be understood that other types of particulate control devices may be utilized for removing the kiln dust from the exhaust process gas as is now known or later developed in the art for removing particles from a gas such as an electrostatic precipitator.

The de-dusted exhaust process gas is transported from first baghouse 128 via exhaust conduit 134 to a second baghouse 140. A sorbent supply 136 containing a sorbent material adapted to sorb and capture targeted pollutants such as mercury is positioned upstream second baghouse 140. Sorbent supply 136 is adapted to inject the sorbent into the de-dusted exhaust process gas stream via conduit 138 to form a treated exhaust process gas. Sorbent supply 136 and conduit 138 are preferably configured to inject the sorbent in a direction transverse exhaust conduit 134 so as to enhance mixing of the sorbent with the targeted pollutants in the de-dusted exhaust process gas flowing through exhaust conduit 134.

Second baghouse 140 downstream of sorbent supply 136 receives the treated stream. The spent sorbent including the captured targeted pollutants is removed from the treated exhaust process gas to form a cleansed exhaust process gas. The spent sorbent is collected on the filter fabric bags within second baghouse 140 and discharged as a waste stream 148. Second baghouse 140 preferably comprises a plurality of fabric filter bags and is preferably designed to have a plurality of sections that can be taken off-line for cleaning the fabric filter bags within any given section. The spent sorbent may be removed from the filter bags in any manner known in the art as heretofore described. Spent sorbent removed from the filter bags falls to the bottom of the baghouse and exits through a drain duct into collection hoppers (not shown) or other means for collecting, further processing, and transporting the spent sorbent for disposal.

The cleansed exhaust process gas is transported via exhaust conduit 142 to stack 146 for release into the atmosphere. Fan 144 draws the exhaust process gas through the first and second baghouses 128, 140 and propels the exhaust process gas stream to stack 146 for release into the atmosphere. Fan 144 is preferably a variable speed fan.

Long Dry Kiln

Looking now to FIG. 3, the system for controlling pollutant emissions is shown applied within a cement manufacturing facility having a pyroprocessing unit 210 using a long dry kiln 216. In this embodiment, the raw materials comprising limestone, shale, clay and iron ore are provided in proportioned amounts in the form of a dry kiln feed. The kiln feed is stored in silo 206 and introduced via conveyer 208 into a long rotary dry kiln 216 where it is heated to temperatures exceeding 2750° F. The calcium oxide or lime (CaO) reacts with alumina, silica, and iron in the kiln 216 to make clinker as is known in the art.

Various fuels may be used to support combustion within the kiln in order to achieve the high processing temperature that is required as previously described. Fuel is delivered via line 218 to a multichannel burner pipe (not shown) in kiln 216 and may also be delivered at various locations along the length of the kiln. The hot clinker is discharged from the kiln into a cooler 220 and cool air is forced into the cooler via forced air fan 222. The cooler air becomes heated as it cools the clinker. This heated air is directed from cooler 220 into kiln 216 to assist with combustion. After being cooled, the clinker is discharged from cooler 220 for further processing to form cement.

The hot exhaust process gases from kiln 216 are routed via conduit 224 to a first baghouse 228 to remove cement kiln dust from the exhaust process gas and form a de-dusted exhaust process gas. The kiln dust removed from the exhaust process gas is discharged as kiln baghouse dust as a waste stream 232. This kiln baghouse dust may be recycled back into and blended with the raw mix in silo 206.

The de-dusted exhaust process gas is transported from first baghouse 228 via exhaust conduit 234 to a second baghouse 240. A sorbent supply 236 containing a sorbent material adapted to sorb and capture targeted pollutants such a mercury is positioned upstream second baghouse 240. Sorbent supply 236 is adapted to inject sorbent into the de-dusted exhaust process gas stream via conduit 238 to form a treated exhaust process gas. Sorbent supply 236 and conduit 238 are preferably configured to inject the sorbent in a direction transverse exhaust conduit 234 so as to enhance mixing of the sorbent with the targeted pollutants in the de-dusted exhaust process gas flowing through exhaust conduit 234.

Second baghouse 240 downstream of sorbent supply 236 receives the treated stream. The spent sorbent including the captured targeted pollutants is removed from the treated exhaust process gas to form a cleansed exhaust. The spent sorbent is collected on the filter fabric bags within second baghouse 240 and discharged as a waste stream 248. The spent sorbent may be removed from the filter bags in any manner known in the art as previously described. The cleansed exhaust process gas is transported via exhaust conduit 242 to stack 246 for release into the atmosphere. Fan 244 draws the exhaust process gas through the first and second baghouses 228, 240 and propels the exhaust process gas stream to stack 246 for release into the atmosphere.

Sorbent Type and Injection Rate

The sorbent utilized in the pollutant control system of the present invention is dependent upon the targeted pollutants desired to be removed from the exhaust process gas. The sorbent may comprise a single component adapted to remove one or more targeted pollutants or may alternatively comprise a mixture of sorbents adapted to remove one or more targeted pollutants. Where trace metals such as mercury are the targeted pollutant, the sorbent preferably comprises a powdered activated carbon (PAC) as is known in the art; although other sorbent materials capable of being directly injected into the exhaust process gas stream and binding with the mercury are considered suitable for purposes of this invention. Multipurpose activated carbon materials considered suitable for purposes of this invention include NORIT DARCO Hg which is commercially available from Norit Americas Inc. Halogen treated activated carbon materials are also considered suited for purposes of this invention such as NORIT DARCO Hg LH commercially available from Norit Americas Inc.

The injection rate of the sorbent into the de-dusted exhaust process gas stream will vary depending upon the sorbent, the composition of the de-dusted exhaust process gas, and other system parameters. In a preferred embodiment where PAC is being utilized to capture all forms of mercury within the exhaust process gas, the injection rate preferably ranges from 0.1-12 pounds per million cubic feet (lb/Macf) of exhaust process gas, more preferably ranging from 1-10 lb/Macf, and most preferably ranging from 1-6 lb/Macf. In a most preferred embodiment, the PAC injection rate will range from 2-4, most preferably 3 lb/Macf, when an in-line raw mill is operating, and will be increased to range from 4-6, most preferably 5 lb/Macf, when there is no in-line raw mill or when the raw mill is not operating.

Baghouse Type

The pollutant control system of the present invention comprises first and second particulate control devices. These particulate control devices may be any devices known in the art for removing the desired particulate, and preferably comprise a baghouse or an electrostatic precipitator. It should be understood that the first and second particulate control devices may not be the same type of device within any given system. For example, the first particulate control device may be an electrostatic precipitator, while the second particulate control device is a baghouse. It is anticipated in many cases, that the first particulate control device may be the primary particulate control device in use within an existing facility and the second particulate control device is added to the facility in order to retrofit the facility to include the pollutant control system of the present invention.

In a preferred embodiment, at least the second particulate control device is a baghouse 40, 140, 240 as shown in FIGS. 1, 2 and 3 comprising a plurality of fabric filter bags for filtering the spent sorbent from the treated exhaust process gas. While any fabric filter bag type is considered suitable for purposes of the present invention, the bag type should be capable of withstanding the temperatures of the system, and preferably capable of withstanding maintained operating temperatures of at least 400° F. A bag type particularly suited for purposes of this invention is a fiberglass bag with membrane surface such as those commercially available from GE Energy. The air-to-cloth ratio (A/C) for the second baghouse 40. 140, 240 will vary depending upon the sorbent and composition of the treated exhaust process gas. For a system using PAC as the sorbent to capture mercury from the de-dusted exhaust process gas, the A/C is preferably higher than 5 and most preferably ranges from 6-8. The baghouse housing and all inlet piping or conduit may be insulated, to maintain temperatures above a specified minimum, such as 200° F.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A cement manufacturing facility having a pollutant control system for removing pollutants from an exhaust process gas, said facility comprising:
    a pyroprocessing unit having a pyroprocessing kiln for forming clinker;
    a raw mill adapted to grind raw materials to form a raw mix;
    a raw mix conveyer adapted to convey said raw mix from said raw mill to said pyroprocessing unit;
    a first particulate control device conduit in fluid communication with the pyroprocessing unit and adapted to convey exhaust process gas from the pyroprocessing unit to a first particulate control device;
    a first particulate control device adapted to remove at least a portion of the pollutants contained with said exhaust process gas to form a de-dusted exhaust process gas;
    a first particulate conveyer adapted to convey the portion of the pollutants removed from the exhaust process gas by said first particulate control device to the raw mix conveyer;
    a second particulate control device conduit in fluid communication with the first particulate control device and adapted to convey said de-dusted exhaust process gas from the first particulate control device to a second particulate control device;
    a sorbent supply comprising a sorbent adapted to capture a targeted pollutant in said de-dusted exhaust process gas, said sorbent supply in fluid communication with the second particulate control device conduit and adapted to inject said sorbent into the second particulate control device conduit for contact with the de-dusted exhaust process gas to form a treated exhaust process gas; and
    a second particulate control device positioned downstream said sorbent supply and adapted to remove at least a portion of said sorbent and said targeted pollutants from said treated exhaust process gas to form a cleansed exhaust process gas.

2. A cement manufacturing facility in accordance with claim 1, wherein said pyroprocessing unit is selected from the group consisting of a dry kiln with a pre-heater, a dry kiln with a pre-heater and a calciner, a long dry kiln and a wet kiln.

3. A cement manufacturing facility in accordance with claim 2, wherein said pyroprocessing unit is a dry kiln with a pre-heater and additionally comprises:
    a raw mill conduit in fluid communication with the pyroprocessing unit and adapted to convey exhaust process gas from the pyroprocessing unit through the raw mill, wherein said first particulate control device conduit is in fluid communication with the raw mill and adapted to convey the exhaust process gas from the raw mill to the first particulate control device.

4. A cement manufacturing facility in accordance with claim 1, wherein said first particulate control device is a baghouse.

5. A cement manufacturing facility in accordance with claim 1, wherein said second particulate control device is a baghouse.

6. A cement manufacturing facility in accordance with claim 5, wherein the air-to-cloth ratio (A/C) for said baghouse is greater than about 5.

7. A cement manufacturing facility in accordance with claim 6, wherein the air-to-cloth ratio (A/C) for said baghouse is ranges from about 6 to 8.

8. A cement manufacturing facility in accordance with claim 1, wherein said targeted pollutant is mercury.

9. A cement manufacturing facility in accordance with claim 8, wherein said sorbent is powdered activated carbon (PAC).

10. A cement manufacturing facility in accordance with claim 9, wherein the sorbent supply is adapted to inject the sorbent into the second particulate device conduit at an injection rate ranging from 0.1-12 lb/Macf.

11. A cement manufacturing facility in accordance with claim 10, wherein the sorbent supply is adapted to inject the sorbent into the second particulate device conduit at an injection rate ranging from 1-10 lb/Macf.

12. A cement manufacturing facility in accordance with claim 10, wherein the sorbent supply is adapted to inject the sorbent into the second particulate device conduit at an injection rate ranging from 1-6 lb/Macf.

13. A cement manufacturing facility in accordance with claim 10, wherein the sorbent supply is adapted to inject the sorbent into the second particulate device conduit at an injection rate of about 5 lb/Macf.

14. A cement manufacturing facility in accordance with claim 3, wherein the sorbent supply is adapted to inject the sorbent into the second particulate device conduit at an injection rate ranging from 2-4 lb/Macf.

15. A cement manufacturing facility in accordance with claim 3, wherein the sorbent supply is adapted to inject the sorbent into the second particulate device conduit at an injection rate of about 3 lb/Macf.

16. A cement manufacturing facility in accordance with claim 3, wherein the sorbent supply is adapted to inject the sorbent into the second particulate device conduit at a higher injection rate when the raw mill is not operational.

17. A method of controlling mercury emissions in the exhaust process gas of a cement manufacturing facility wherein the cement manufacturing facility comprises a pyroprocessing unit having a dry kiln and a pre-heater, said method comprising:

conveying hot exhaust process gas from a dry kiln to a pre-heater and using the hot exhaust process gas therein to pre-heat a kiln feed for the kiln;

conveying exhaust process gas from the pre-heater to a raw mill and using the exhaust process gas therein to assist in drying the raw mix;

transported the exhaust process gas from the raw mill to a first baghouse;

removing at least a portion of kiln dust contained within the exhaust process gas from the exhaust process gas to form a de-dusted exhaust process gas;

mixing the portion of kiln dust removed from the exhaust process gas with the raw mix to form kiln feed;

transporting the de-dusted exhaust process gas from the first baghouse to a second baghouse;

supplying a sorbent to the de-dusted exhaust process gas upstream of the second baghouse to form a treated exhaust process gas, said sorbent adapted to capture targeted pollutants in said treated exhaust process gas and form a spent sorbent; and removing said spent sorbent from the treated exhaust process gas within said second baghouse to form a cleansed exhaust process gas.

18. A method in accordance with claim 17, wherein said targeted pollutant is mercury.

19. A method in accordance with claim 18, wherein said sorbent is powdered activated carbon (PAC).

20. A method of controlling mercury emissions in the exhaust process gas of a cement manufacturing facility wherein the cement manufacturing facility comprises a pyroprocessing unit with a kiln, said method comprising:

conveying hot exhaust process gas from a kiln to a first particulate control device;

removing at least a portion of kiln dust contained within the exhaust process gas from the exhaust process gas to form a de-dusted exhaust process gas;

mixing the portion of kiln dust removed from the exhaust process gas with a raw mix to form kiln feed;

transporting the de-dusted exhaust process gas from the first particulate control device to a second particulate control device;

supplying a sorbent to the de-dusted exhaust process gas upstream of the second particulate control device to form a treated exhaust process gas, said sorbent adapted to capture targeted pollutants in said treated exhaust process gas and form a spent sorbent; and removing said spent sorbent from the treated exhaust process gas within said second particulate control device to form a cleansed exhaust process gas.

21. A method in accordance with claim 20, wherein said targeted pollutant is mercury.

22. A method in accordance with claim 21, wherein said sorbent is powdered activated carbon (PAC).

23. A method in accordance with claim 21, wherein said method additionally comprises conveying hot exhaust process gas from a kiln to a pre-heater and using the hot exhaust process gas therein to pre-heat a kiln feed for the kiln.

24. A method in accordance with claim 23, wherein said method additionally comprises conveying exhaust process gas from the pre-heater to a raw mill and using the exhaust process gas therein to assist in drying the raw mix.

25. A method in accordance with claim 21, wherein said method additionally comprises conveying exhaust process gas from the pyroprocessing unit to a raw mill and using the exhaust process gas therein to assist in drying the raw mix.

* * * * *